United States Patent
Kuku et al.

(10) Patent No.: US 11,612,858 B2
(45) Date of Patent: Mar. 28, 2023

(54) EXHAUST GAS CLEANUP AND RECOVERY SYSTEM CO2 CAPTURE AND SEQUESTRATION WITH COMMERCIAL BYPRODUCTS

(71) Applicant: GLOBAL CARBON EMISSIONS SOLUTIONS LLC, Gilbert, AZ (US)

(72) Inventors: Lai O. Kuku, Gilbert, AZ (US); Gypsy M. Biller, Chandler, AZ (US); Michael P. Woudenberg, Phoenix, AZ (US); Kyle J. Koleber, Phoenix, AZ (US)

(73) Assignee: Global Carbon Emissions Solutions, LLC, Gilbert, AZ (US)

( * ) Notice: Subject to any disclaimer, the term of this patent is extended or adjusted under 35 U.S.C. 154(b) by 0 days.

(21) Appl. No.: 17/403,580

(22) Filed: Aug. 16, 2021

(65) Prior Publication Data

US 2022/0323902 A1 Oct. 13, 2022

Related U.S. Application Data

(60) Provisional application No. 63/173,416, filed on Apr. 10, 2021.

(51) Int. Cl.
*B01D 53/75* (2006.01)
*B01D 53/78* (2006.01)
(Continued)

(52) U.S. Cl.
CPC ............. *B01D 53/78* (2013.01); *B01D 53/75* (2013.01); *B01D 53/79* (2013.01); *B01D 53/96* (2013.01); *B01D 2251/304* (2013.01); *B01D 2251/404* (2013.01); *B01D 2251/604* (2013.01); *B01D 2251/606* (2013.01); *B01D 2251/61* (2013.01);
(Continued)

(58) Field of Classification Search
CPC ........ B01D 53/78; B01D 53/75; B01D 53/79; B01D 53/96; B01D 2258/0283; B01D 2257/504; B01D 2259/124; B01D 2251/404; B01D 2251/604;
(Continued)

(56) References Cited

U.S. PATENT DOCUMENTS

2019/0160395 A1* 5/2019 Saini ...................... B01D 17/02

FOREIGN PATENT DOCUMENTS

FR 3 108 859 A1 * 10/2021 ............. C02F 1/4693
WO WO 2020 016 012 A1 * 1/2020 ............. B01D 47/06

* cited by examiner

*Primary Examiner* — Timothy C Vanoy

(57) ABSTRACT

A fossil fuel fired power plant exhaust gas clean-up and recovery system is provided to remove detrimental exhaust gases from the power plant exhaust and to produce and reclaim various commercial byproducts. A process includes mixing one liquid solution with a solubilizer in a mixing tank containing water to create a chemical reaction therein to produce an ionic solid compound and an alkaline liquid solution. Simultaneously directing the flue gases and the alkaline liquid solution into the wet scrubber to create a chemical reaction therein. The chemical reaction removes various detrimental exhaust gases from the flue gases and captures $CO_2$ gases therefrom, which are chemically transferred into a newly formed sodium bicarbonate solution. The sodium bicarbonate solution exiting the wet scrubber is stored for resale or reuse in the subject process. The process uses various pathways to distribute the sodium bicarbonate for producing other byproducts.

12 Claims, 5 Drawing Sheets

(51) Int. Cl.
  *B01D 53/79* (2006.01)
  *B01D 53/96* (2006.01)
  *C02F 1/469* (2023.01)
(52) U.S. Cl.
  CPC ............... *B01D 2257/504* (2013.01); *B01D 2258/0283* (2013.01); *B01D 2259/124* (2013.01); *C02F 1/4695* (2013.01)
(58) Field of Classification Search
  CPC .......... B01D 2251/61; B01D 2251/606; B01D 2251/304; C02F 1/4695
  See application file for complete search history.

EXHAUST GAS CLEANUP AND RECOVERY SYSTEM CO2 CAPTURE AND SEQUESTRATION WITH COMMERCIAL BYPRODUCTS

TECHNICAL FIELD

The subject process relates generally to an exhaust emissions clean-up system that helps remove detrimental exhaust gas compositions when the exhaust gases are exposed to a chemically produced alkaline liquid cleaning solution. The chemically produced alkaline liquid cleaning solution and more specifically to a process that cleans exhaust gases from fossil fuel fired plants to remove the detrimental exhaust gas compositions, $CO_2$ capture, and to reclaim various byproducts from the used cleaning solutions and sequester captured $CO_2$.

BACKGROUND

There have been many different arrangements that attempt to remove detrimental flu gas compositions, but most of them are only partially effective in removing most if not all of the detrimental exhaust gas compositions. This due to the extreme cost of effective types of exhaust cleaning systems. Emissions of nitrogen oxides into the atmosphere can result in the generation of ozone in our atmosphere. Ozone is important in our higher altitudes since it helps offset the effects of the sun's damaging rays on the earth. However, ozone can be s hazard to humans when it is within our habitable altitude. Another emitted gas that is detrimental is sulfur dioxide. It reacts with atmospheric water and cause acid rain. Likewise, carbon dioxide creates major environmental issues when exhausted into the atmosphere and is the main cause of global warming and climate change. U.S. Pat. No. 8,501,105 issued to Fan et al., in 2012, teaches the use of a two-step gas-solid contact reactors containing sorbents including a solid metal oxide, and further calcining the spent sorbent from the first gas-solid contact reactor so as to generate carbon dioxide and to regenerate the sorbent. There is no teaching or suggestion of using a sole wet scrubber having an alkaline cleaning solution therein produced by mixing a blended solution with a solubilizer to create the alkaline cleaning solution. The alkaline cleaning solution acts on the flue gases in the scrubber to capture carbon dioxide and remove detrimental flue gas compositions from the exhaust gases of a fossil fuel fired power/industrial plant and to generate, reclaim and/or reuse these reclaim elements.

U.S. Pat. No. 8,119,091 issued to Keith et al., teaches the use of a multiple step process in which sodium carbonate solution is treated by causticization to generate carbon dioxide and sodium hydroxide. Keith et al., also teaches a multiple step process within which anhydrous sodium carbonate is reacted with sodium tri-titanate to produce carbon dioxide and sodium penta-titanate, and the sodium hydroxide and sodium tri-titanate are regenerated from the sodium penta-titan ate. The process taught by Keith et al. does not include the solubilizing of a blended solution with a solubilizer in water for the generation of an ionic solid and an alkaline liquid solution for the removal of the detriment exhaust gases including the capture of carbon dioxide.

U.S. Pat. No. 9,833,739 which issued on Dec. 5, 2017, to Kuku et al., teaches a two-step process within which calcium carbonate is used to capture $CO_2$ in a first wet scrubber. The second process involves the use of a reaction chamber within which a solubilizer, such as glycerol, is added to calcium hydroxide to enhance its solubility to reduce mercury and mercuric salts and other flue gas emissions in the exhaust gas streams and generate calcium carbonate for reuse in the first scrubber. The reduced sulfur in the exhaust gas stream is reduced as precipitated sodium sulfate.

U.S. Pat. No. 9,981,220 issued May 29, 2018 to Kuku et al., teaches the use of an acid dosing system for the removal of dissolved $CO_2$ from water and the precipitation of calcium sulfate in the acid dosing and degassing process. Acid dosing of liquids with dissolved gases and the use of hydrophobic membranes for degassing of $CO_2$ and 02 from liquids are well known.

The sequence of the various steps and the interaction therebetween permits the production of various byproducts, and which in some instances permit the use of the byproducts in the chemical reaction of blended solutions in other parts of the process. Various patents and publications, including; Pub. No. US2010/0251937 A1 and WO 2017/029509 each teach a process consisting of contacting $CO_2$ laden gas with CaO or lime in a reactor or such that CaO captures $CO_2$ by the formation of $CaCO_3$ (calcium carbonate). The calcium oxide is regenerated by calcination leading to the formation of fresh CaO sorbent and the release of a concentrated stream of $CO_2$. This carbonation-calcination process requires heat and the process is similar to the methods used in the production of cement globally.

None of the above patents and publications teach singularly or in combination the subject process claimed herein. The claimed subject processes serve as a possible solution to removing at least the above noted detrimental gases, enhancing $CO_2$ capture and reclaiming various byproducts from the used cleaning solutions.

SUMMARY OF THE INVENTION

According to the present process, an exhaust gas clean-up and recovery system is provided that is effective to remove various detrimental gases, such as, sulfur dioxide, carbon dioxide, and nitrogen oxides from fossil fuel power plants or other industrial power plants prior to the exhaust gas entering the atmosphere. In general, these process steps comprise directing the exhaust gas from the power plant to a single or multi-arranged wet scrubber system to modify the exhaust gas. Prior to modifying the exhaust gases, an alkaline liquid cleaning solution is chemically produced by mixing a blended solution with a solubilizer to enhance the resulting alkaline liquid cleaning solution. During the chemical reaction, an ionic solid is produced and saved for commercial use.

Even though several blended solutions could be used in the mixture, it is preferred to use one of calcium hydroxide or calcium carbonate. It is recognized that other blended solutions could be used without departing from the subject design. Likewise, various solubilizers could be used in the mixture, such as but not limited to; sodium phosphate, sodium bicarbonate, sodium carbonate, lithium phosphate, and potassium carbonate. It is preferred to use one of sodium phosphate, sodium bicarbonate, and sodium carbonate. Once the alkaline liquid cleaning solution is produced it is passed into and through the wet scrubber. As the alkaline liquid cleaning solution interacts with the exhaust gases in the wet scrubber, a chemical reaction occurs and the detriment gases are totally removed. The alkaline liquid cleaning solution initially captures the $CO_2$ gases. During the chemical reaction, the captured $CO_2$ gases are chemically transformed to a newly formed sodium bicarbonate solution. The sodium bicarbonate solution is passed from the wet scrubber and stored in a sodium bicarbonate solution tank.

The sodium bicarbonate solution is selectively directed to various fluid pathways for additional processing to obtain various byproducts. Each of the fluid pathways functions to separate and save the pure $CO_2$ gases for commercial uses or further refine the sodium bicarbonate solution to produce other byproducts for commercialization or reuse in the subject process. For example, but not limited to, $CO_2$ is captured and stored for commercial use, sodium bicarbonate is stored for reuse and may also be sold commercially as baking soda, sodium hydroxide is produced and reused in the process. Additionally, calcium carbonate is produced in one of the fluid pathways and can be sold or reused in the process, sodium sulfate and sodium chloride are also produced, saved, and sold for commercial use.

Other objects, features, and advantages of the subject process will become more apparent from the following detailed description of the embodiments and certain modification thereof when taken together with the accompanying drawings.

DETAILED DESCRIPTION

Figure 1:
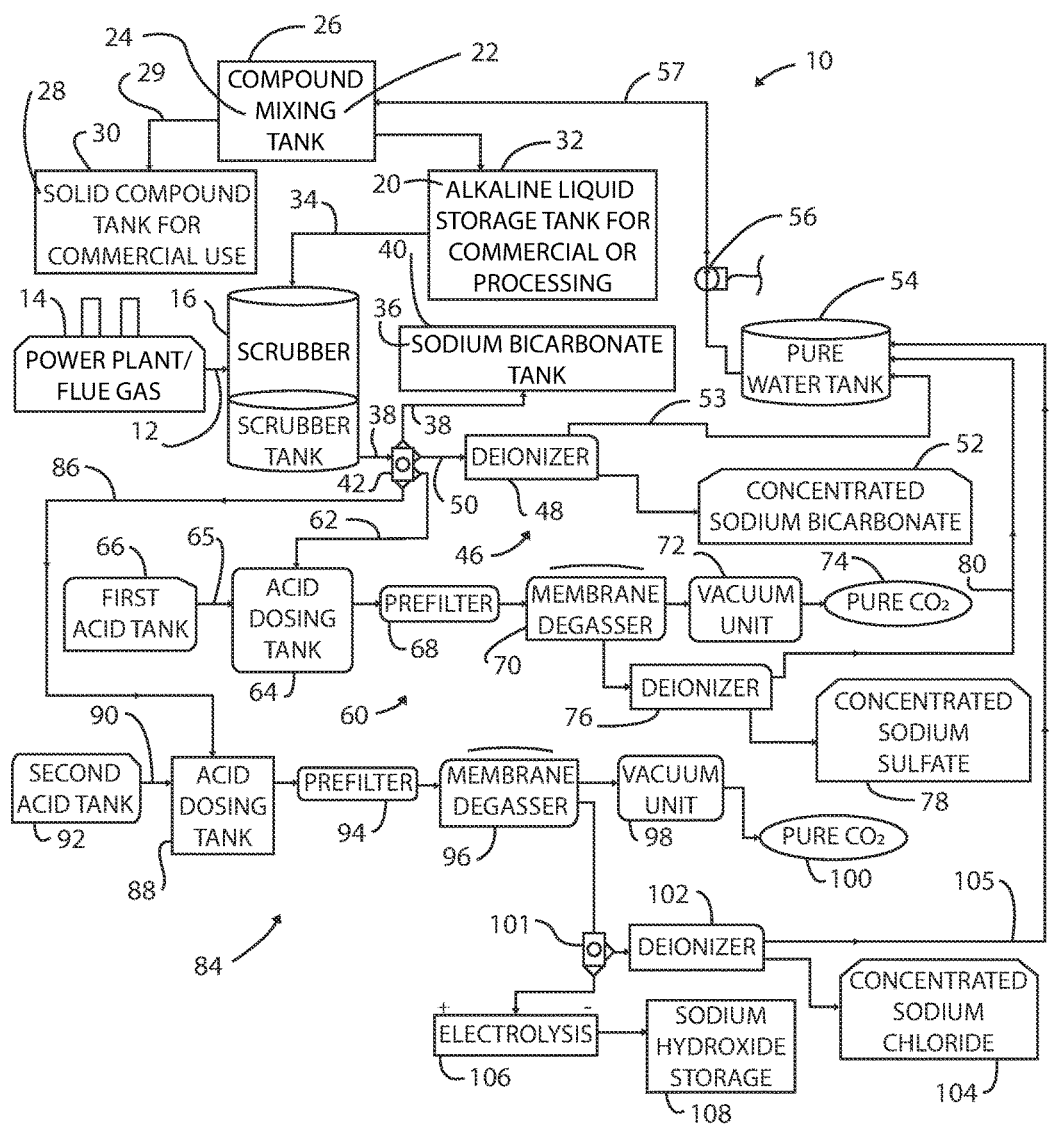
FIG. 1 is a partial flow chart and a partial diagrammatic representation of an embodiment of the subject process.

Referring to the embodiment of FIG. 1 of the drawings, an exhaust gas clean-up and recovery system 10 is provided including various process steps. The process steps are effective to remove various detrimental gases, such as sulfur dioxide, carbon dioxide, and nitrogen oxides from the exhaust gases 12 of fossil fuel fired power plants or any industrial plants 14 (power plant) prior to the exhaust gases 12 entering the atmosphere. In general, these operational process steps include directing the exhaust gas 12 from the respective liquid solution power plants 14 to and through a single or multi-arranged wet scrubber, herein after scrubber 16, in order to remove the detrimental gases. A highly alkaline liquid 20 is desirable for passing through the exhaust gases 12 flowing therethrough from the power plant 14. The chemical reaction produced between the exhaust gases and the highly alkaline liquid solution 20 is effective to capture the $CO_2$ gases contained within the flue gases, modify and substantially remove all of the remaining detrimental exhaust gases 12.

In order to produce the desirable highly alkaline cleaning solution 20 for the chemical reaction, a blended solution 22+water, and a solubilizer 24 are mixed in a blended solution mixing tank 26. The chemical reaction within the blended solution mixing tank 26 produces an ionic solid 28 that is drawn off through line 29 and stored in an ionic solid tank 30. The chemical reaction in the mixing tank 26 further produces the highly desired alkaline liquid cleaning solution 20 in which the resulting alkaline liquid cleaning solution 20 has been enhanced. The enhanced alkaline liquid solution 20 is passed to an alkaline liquid storage tank 32 for further use.

The enhanced alkaline liquid solution 20 is directed from the alkaline liquid storage tank 32 to and through the scrubber 16 by line 34 wherein the enhanced alkaline liquid solution 20 is passed through the exhaust gases 12 flowing therethrough from the power plant 14. A chemical reaction occurs within the scrubber 16 between the mixture of the exhaust flu gases 12 and the enhanced alkaline liquid solution 20. The sulfur dioxide and nitrogen oxides are removed and the $CO_2$ gas is captured by the enhanced alkaline liquid solution 20. During the chemical reaction in the scrubber 16, the captured $CO_2$ gases are chemically transformed to a newly formed sodium bicarbonate solution 36. The sodium bicarbonate solution 36 is passed from the scrubber 16 through a line 38 and retained in a sodium bicarbonate solution tank 40. A multi-directional selector valve 42 is disposed in the line 38 and functions to interconnect the outlet of the scrubber 16 with the sodium bicarbonate solution tank 40 and different fluid pathways.

A first fluid pathway 46 has a deionizer 48 (Reverse Osmosis) therein selectively connected by line 50 and line 38 to the scrubber 16 and/or the sodium bicarbonate solution 36. It is recognized that the deionizer 48 could be replaced with an electrochemical process without departing from the subject process. Here-in-after, it is understood that the electrochemical process can be used in place of the deionizer without departing from the essence of the subject process. The result of each process is substantially the same. As the sodium bicarbonate solution 36 flows through the two ion exchange materials within the deionizer 48, most, if not all, of the dissolved salt content is removed from the water. The sodium bicarbonate solution 36 exits the bottom of the deionizer 48 as a concentrate of liquid bicarbonate salt (baking soda) and is stored in a concentrated sodium bicarbonate tank 52. The clean/pure water exits the top of the deionizer 48 and flows through a water line 53 to a pure water tank 54. The water in the pure water tank 54 has a pH of at least 7 for best results. It should be understood that the pH level of the water could be below 7 pH and that the process would still function even though efficiency would be lowered.

In order to ensure that the pure water readily reaches the mixing tank 26, a selectively controlled pump 56 is disposed in a line 57 connected between the pure water tank 54 and the liquid solution mixing tank 26.

A second fluid pathway 60 has a line 62 connecting a first dosing tank 64 with the sodium bicarbonate solution 36 through the multi-directional valve 42 and a line 65 connects a first acid tank 66 to the first dosing tank 64. The main function of the first acid is to aid in loosening the dissolved $CO_2$ gas from the sodium bicarbonate solution 36. As the acid in the first acid tank 66 is being metered into the first dosing tank 64 to react with the sodium bicarbonate solution 36 therein, an exothermic reaction occurs and the $CO_2$ gas is loosened from the sodium bicarbonate solution 36 in the form of carbonic acid. The carbonic acid quickly decomposes to release the $CO_2$ and pure water. The acid dosed liquid is passed through a prefilter 68 to remove any precipitates that might have formed. The remainder of the aqueous solution is directed on to a hydrophobic membrane installed in a membrane degasser 70. The function of the membrane degasser 70 is to separate the $CO_2$ gas from the acid dosed solution and in conjunction with a vacuum unit 72 deliver the high purity $CO_2$ to a storage tank 74 for commercial use. The remaining salt solution from the membrane degasser 70 is directed through another deionizer 76 which, depending on the acid used, separates substantially all of the dissolved salt content from the salt solution and directs it into a salt solution storage tank 78 and the pure water is directed through line 80 to the pure water tank 54.

A third fluid pathway 84 has a line 86 connecting a second acid dosing tank 88 with the sodium bicarbonate solution 36 through the multi-directional valve 42. A line 90 connects a second acid tank 92 to the second dosing tank 88. The main function of the second acid tank 92 is to aid in loosening the dissolved $CO_2$ gas from the sodium bicarbonate solution 36. As the second acid 92 is being metered into the second dosing tank 88 to react with the sodium bicarbonate solution 36, an exothermic reaction occurs and the $CO_2$ gas is loosened from the sodium bicarbonate solution 36 in the form of carbonic acid. The carbonic acid quickly decomposes to release the $CO_2$ gas and pure water. The acid dosed liquid is passed through a second prefilter 94 to remove any precipitates that might have formed. The remainder of the aqueous salt solution is directed on to a second hydrophobic membrane installed in a second membrane degasser 96. The function of the second membrane degasser 96 is to separate the carbon dioxide gas from the aqueous salt solution and in conjunction with a second vacuum unit 98 delivers the high purity $CO_2$ to a second storage tank 100 for commercial use.

The remaining aqueous salt solution from the second membrane degasser 96 is selectively directed through another multi-directional valve 101 to yet another deionizer 102 which, depending on the acid used, separates substantially all of the dissolved salt content from the solution and directs it into a second salt solution storage tank 104. The pure water is directed through line 105 to the pure water tank 54.

Another portion of the remaining salt solution from the second membrane degasser 96 may also be selectively directed through the multi-directional valve 101 to an electrolysis process 106. In the electrolysis process 106, electrical current is passed through the salt solution therein for the production of sodium hydroxide that is stored in the sodium hydroxide storage 108 for reuse or commercially sold.

Figure 1A:
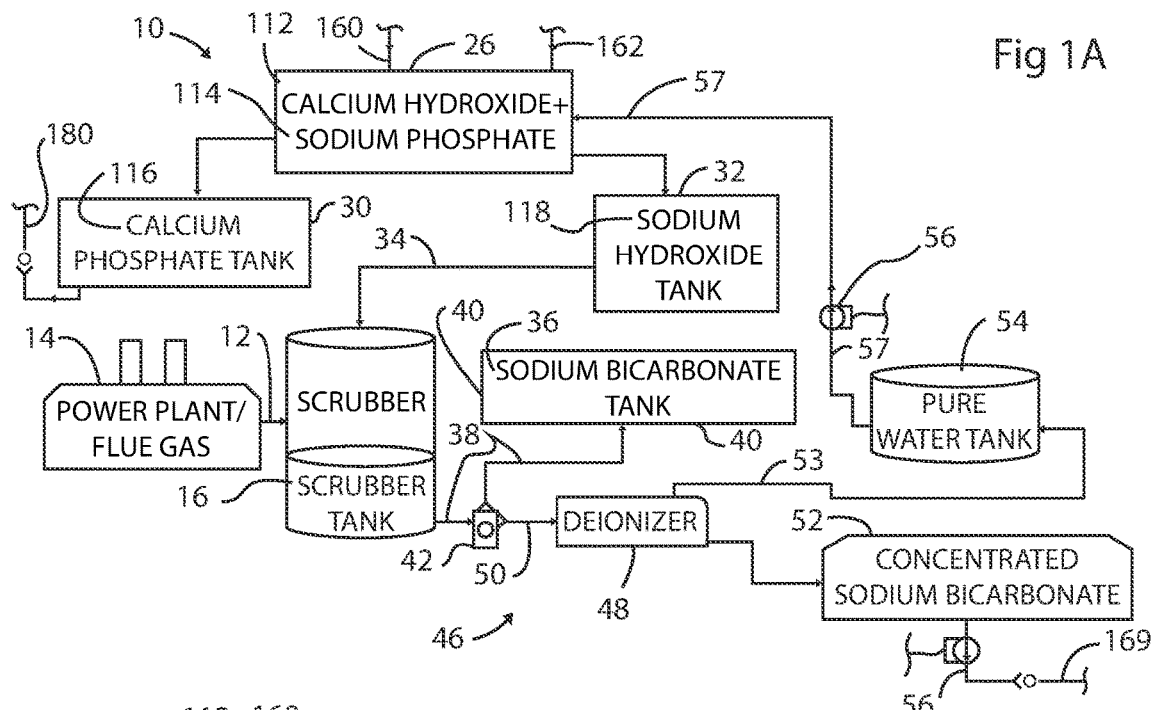
FIG. 1A is a partial flow chart and a partial diagrammatic representation of another embodiment taken from the embodiment of FIG. 1.

Referring to FIG. 1A, a portion of FIG. 1 is illustrated. Like elements, used in FIG. 1 and reused in any of the remaining FIGS. 1A-1C and FIG. 2, and having the same element number will have the same element number hereafter. Any element of FIG. 1, that has been changed or modified will hereafter have the same element number with a prime symbol (') following the element number.

In the embodiment of FIG. 1A, a calcium hydroxide 112 (blended solution), water, and sodium phosphate 114 (solubilizer) are mixed in the mixing tank 26 to chemically produce calcium phosphate 116 (ionic solid) and an alkaline liquid sodium hydroxide solution 118 (alkaline liquid solution). The selectively controlled pump 56 supplies the water from the pure water tank 54 to the mixing tank 26 through the line 57.

The concentrated alkaline liquid sodium hydroxide solution 118 is directed to and through the wet scrubber 16. At the same time, the exhaust gases 12 from the power plant 14 are being delivered to the wet scrubber 16 and through the alkaline liquid sodium hydroxide solution 118 that is flowing therethrough. The enhanced alkaline liquid solution 118 effectively captures the $CO_2$ gases contained in the exhaust flues gases 12. The mixing of the exhaust gases 12 and the alkaline liquid sodium hydroxide solution 118 in the scrubber 16 creates a chemical reaction therein. As a result of the chemical reaction, the detrimental exhaust gases 12, such as sulfur dioxides nitrogen oxides, are effectively removed from the exhaust flue gases 12. During the chemical reaction, the captured $CO_2$ gases are chemically transformed to a newly formed sodium bicarbonate solution 36. The sodium bicarbonate liquid solution 36 is delivered from the scrubber 16 through line 38 and multi-directional vale 42 to the sodium bicarbonate solution tank 40 for further processing or sold for commercial uses.

In the subject arrangement of FIG. 1A, the sodium bicarbonate solution 36 is selectively delivered through the multi-directional valve 42, as set forth and described in FIG. 1, to the first fluid passageway 46. The first fluid pathway 46 described with respect to FIG. 1 and the first fluid pathway 46 set forth here are the same and will not be repeated.

Referring to the embodiment of FIG. 1B, only the differences of this embodiment with respect to that set forth in FIG. 1 will be discussed. In the subject arrangement of FIG. 1B, the calcium hydroxide and sodium phosphate used in the mixing tank 26 of FIG. 1A are the same as the ones used herein. Consequently, the results of the chemical reaction and results within the mixing tank 26 are the same. The power plant 14, exhaust gases 12 and scrubber 16 are the same. Since the same type of sodium hydroxide and sodium phosphate are being used, the results within the scrubber 16 will be the same. The output from the scrubber 16 is still a solution of sodium bicarbonate 36 being directed to the sodium bicarbonate solution tank 40.

Figure 1B:
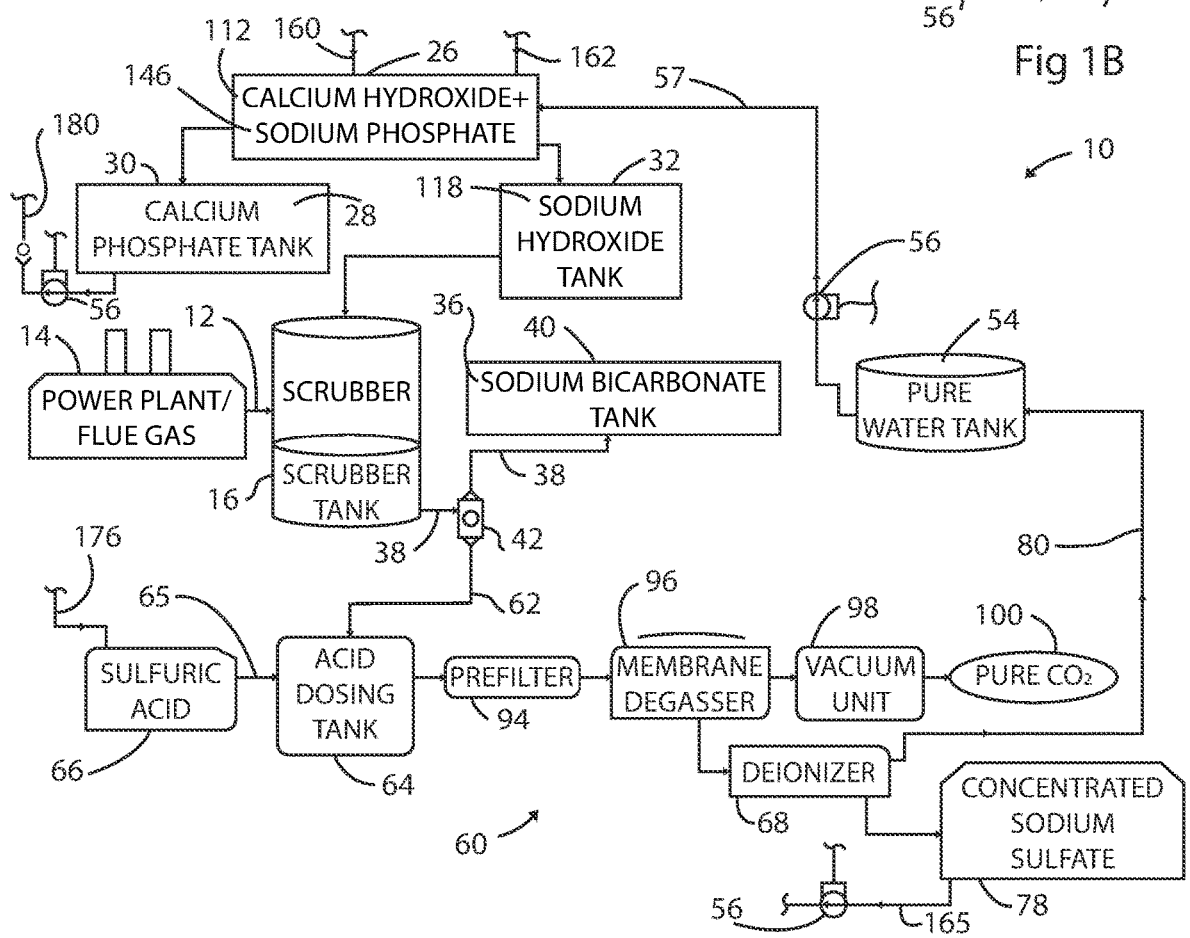
FIG. 1B is a partial flow chart and a partial diagrammatic representation of another embodiment taken from the embodiment of FIG. 1.

In the process of FIG. 1B, the sodium bicarbonate solution 36 is selectively directed through the multi-directional valve 42 and line 62 to the first acid dosing tank 64. The line 65 connects the sulfuric acid from the first acid tank 66 to the acid dosing tank 64. The main function of the sulfuric acid from the first acid dosing tank 64 is to aid in loosening the dissolved $CO_2$ gases from the sodium bicarbonate solution 36. As the sulfuric acid is being metered into the acid dosing tank 64 to react with the sodium bicarbonate solution 36, an exothermic reaction occurs and the $CO_2$ gases are loosened from the sodium bicarbonate solution 36 in the form of carbonic acid. The carbonic acid quickly decomposes to release the $CO_2$ gases and pure water. As previously set forth above, the acid dosed liquid is passed through a prefilter 68 to remove any precipitates that might have formed. Likewise, in the membrane degasser 70, the $CO_2$ gases are separated from the sodium bicarbonate solution 36 and by use of a vacuum unit 72 the $CO_2$ gases are drawn off and passed to a $CO_2$ storage unit. The separated solution, comprising mostly of sodium sulfate is directed into the deionizer 76 to remove substantially all of the dissolved salt content from the separated solution. The sodium sulfate exits as a liquid concentrate salt and pure water. The concentrated sulfate salt solution is passed to the concentrated sodium sulfate tank 78 and the water is passed to the pure water tank 54 through line 80.

Referring to the embodiment of FIG. 1C, only the differences between FIG. 1B and FIG. 1C will be discussed. Calcium carbonate 122 (blended solution), plus water, and sodium phosphate 114 (solubilizer) are chemically mixed in the mixing tank 26. The chemical reaction in the mixing tank 26 produces an ionic solid calcium phosphate 116 and an alkaline sodium carbonate liquid solution 124. As set forth above with respect to the alkaline sodium hydroxide solution 118, the alkaline sodium carbonate liquid solution 124 is passed through the wet scrubber 16 and interacts with the exhaust gases 12 from the power plant 14 to remove all of the detriment gases in the exhaust gases 12. The $CO_2$ gases captured by the alkaline sodium carbonate liquid solution 124 are chemically transformed into a newly formed sodium bicarbonate solution 36. Even though the alkaline liquid sodium carbonate solution 124 is different from the alkaline liquid sodium hydroxide solution 118, the chemical reaction within the scrubber 16 still produces the sodium bicarbonate solution 36.

The sodium bicarbonate solution 36 from the scrubber 16 is selectively directed through the multi-directional valve 42 and line 86 to the second acid dosing tank 88. The line 90 connects the hydrochloric acid 126 from the second acid tank 92 to the dosing tank 88. Other acids may be used without departing from the essence of the subject process. The main purpose of the hydrochloric acid 126 is to aid in loosening the dissolved $CO_2$ gases contained in the aqueous solution passing therethrough. As the hydrochloric acid 126 and the sodium bicarbonate solution 36 mix within the second acid dosing tank 88 and the combined flow is metered therefrom, an exothermic reaction occurs. The $CO_2$ gases are released from the solution of sodium bicarbonate in the form of carbonic acid. The hydrochloric acid dosed liquid is passed through the prefilter 94 to remove any precipitates that may have formed.

The remaining aqueous solution containing water, aqueous sodium sulfate and $CO_2$ gas is directed on to the membrane degasser 96 which functions to separate the $CO_2$ gas from the remaining salt solution. The vacuum unit 98 pulls the high-purity $CO_2$ gas from the membrane degasser 96 and directs it to the pure $CO_2$ tank 100. The separated salt solution comprised mostly of sodium chloride is selectively directed through the multi-directional valve 101 to the deionizer 102 where substantially all of the dissolved salt content is removed and passed on to the concentrated sodium chloride tank 104 for storage and/or commercial use. The pure water is pasted through line 105 to the pure water tank 54. Another potion of the separated solution coming from the membrane degasser 96 may also be selectively directed across the multi-directional valve 101 to the electrolysis process 106 wherein current is directed through the separated salt solution to release the sodium hydroxide solution 108 therefrom and pass the sodium hydroxide solution to the sodium hydroxide storage tank 108.

Figure 2:
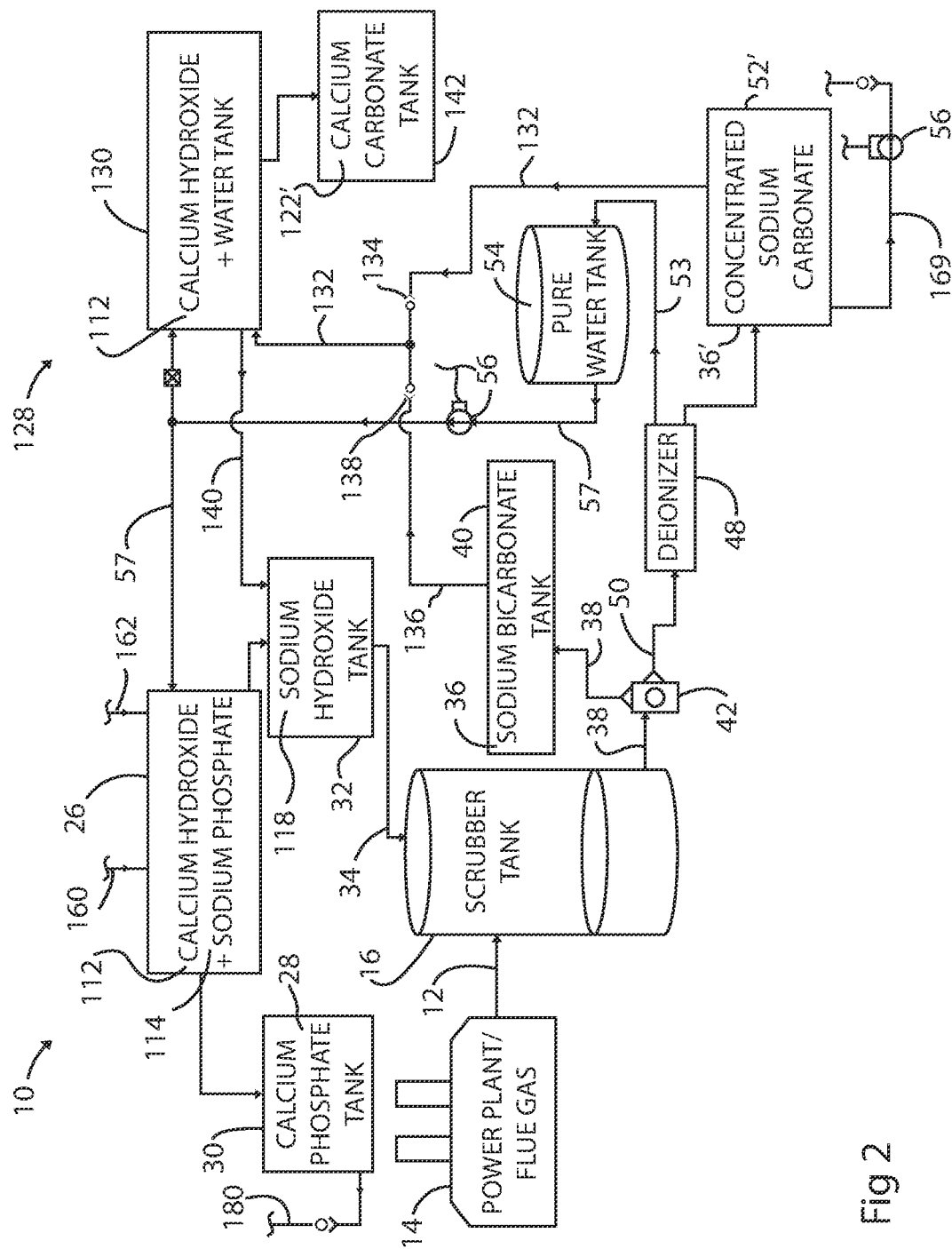
FIG. 2 is a partial flow chart and a partial diagrammatic representation of yet another embodiment taken from the embodiment of FIG. 1.

Referring to the embodiment of FIG. 2, a fourth fluid pathway 128 of the subject process is set forth. FIG. 2 is very similar to that set forth in FIG. 1A. Only the differences will be set forth herein. The mixing tank 26 includes the calcium hydroxide 112 plus water and the sodium phosphate 114. The chemical reaction produces the same ionic solid calcium phosphate 28 which is stored in the calcium phosphate tank 30. Likewise, the same alkaline sodium hydroxide solution 118 is produced and stored in the tank 32. The alkaline sodium hydroxide solution 118 is passed through the scrubber 16 to interface with the exhaust gases 12 being exhausted from the power plant 14. The exhaust gases 12 from the power plant 14 contains the detriment gases which, as set forth above, includes carbon dioxide ($CO_2$), sulfur dioxide, and nitrogen oxides.

The $CO_2$ contained in the exhaust flue gases are captured by the alkaline sodium hydroxide solution 118. The chemical reaction within the scrubber 16 between the alkaline sodium hydroxide solution 118 and the exhaust flue gases 12 from the power plant 14 removes the detriment exhaust gases 12, such as sulfur dioxide and nitrogen oxides. The $CO_2$ gases retained in the alkaline sodium hydroxide solution 118 are chemically transformed to the newly formed sodium bicarbonate solution 36. The enhanced sodium bicarbonate solution 36 exiting from the scrubber 16 is directed through line 38 and the multi-directional valve 42 to the sodium bicarbonate solution tank 40.

Additionally, as set forth in FIG. 1A, the enhanced sodium bicarbonate solution 36 is selectively directed through the multi-directional 42 to the deionizer 48 through line 50. As the sodium bicarbonate liquid solution 36 passes through the deionizer 48, most of the salts, contained in the form of enriched sodium bicarbonate salts 36, passes from the bottom of the deionizer 48 to a concentrated sodium bicarbonate tank 52'. The clean water is passed from the top of the deionizer 48 through the line 53 to the pure water tank 54. The selectively controlled pump 56 is disposed in the line 57 to selectively supply water to the mixing tank 26 as needed.

In the subject embodiment, a second mixing tank 130 is provided and connected to a concentrated sodium bicarbonate tank 52' through a line 132 having a one-way check valve 134 disposed therein. The second mixing tank 130 is further connected to the first sodium bicarbonate tank 40 through a line 136 having a one-way check valve 138 disposed therein in a portion of the line 132 downstream of the first one-way check valve 134.

Calcium hydroxide 112 is selectively provided in the second mixing tank 130 along with water that is selectively provided from the pure water tank 54 through line 57. The solubilizer being provided to the second mixing tank 130 to promote a chemical reaction in the second mixing tank 130 is the concentrated sodium bicarbonate solution 36' stored in the concentrated sodium bicarbonate solution tank 52' and/or the sodium bicarbonate solution 36 stored in the sodium bicarbonate tank 40.

The chemical reaction within the second mixing tank 130 produces an alkaline sodium hydroxide solution 118 that is recovered and passed from the second mixing tank 130 to the sodium hydroxide tank 30 through a line 140. The ionic solid produced is a calcium carbonate 122' that is stored in a calcium carbonate tank 142.

As clearly shown in FIG. 2., the fourth fluid pathway 128 reuses the concentrated sodium bicarbonate solution 36' contained in the concentrated sodium bicarbonate tank 52'. The concentrated sodium bicarbonate solution 36' is mixed in the second mixing tank 130 with the calcium hydroxide and water to produce additional sodium hydroxide 118 that is recovered and added to the sodium hydroxide tank 32. Additionally, the chemical reaction in the second mixing tank 130 produces calcium carbonate 122' that is stored in the calcium carbonate tank 142 for possible reuse or marketed for commercial use.

Figure 1C:
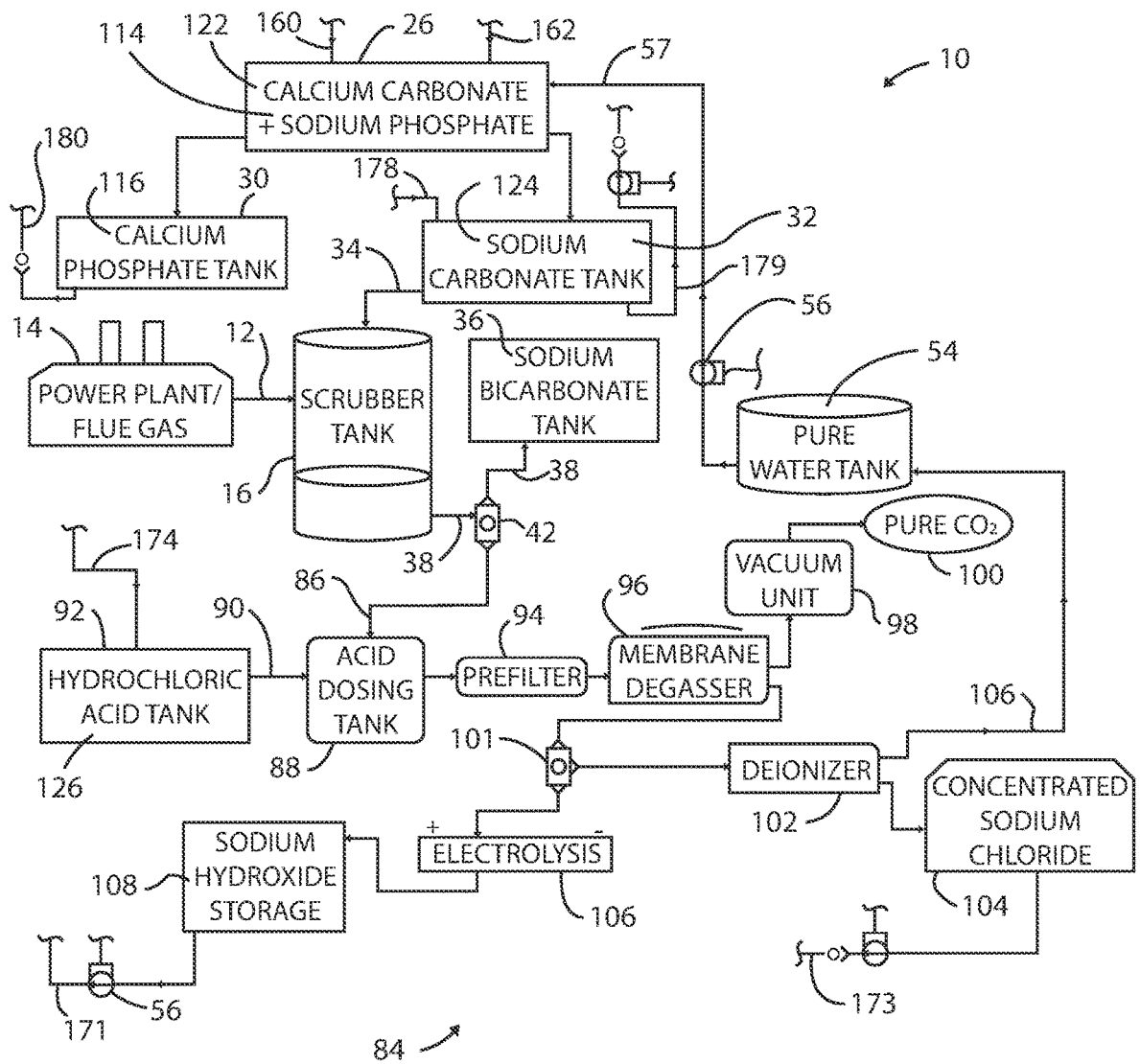
FIG. 1C is a partial flow chart and a partial diagrammatic representation of another embodiment taken from the embodiment of FIG. 1.
Figure 3:
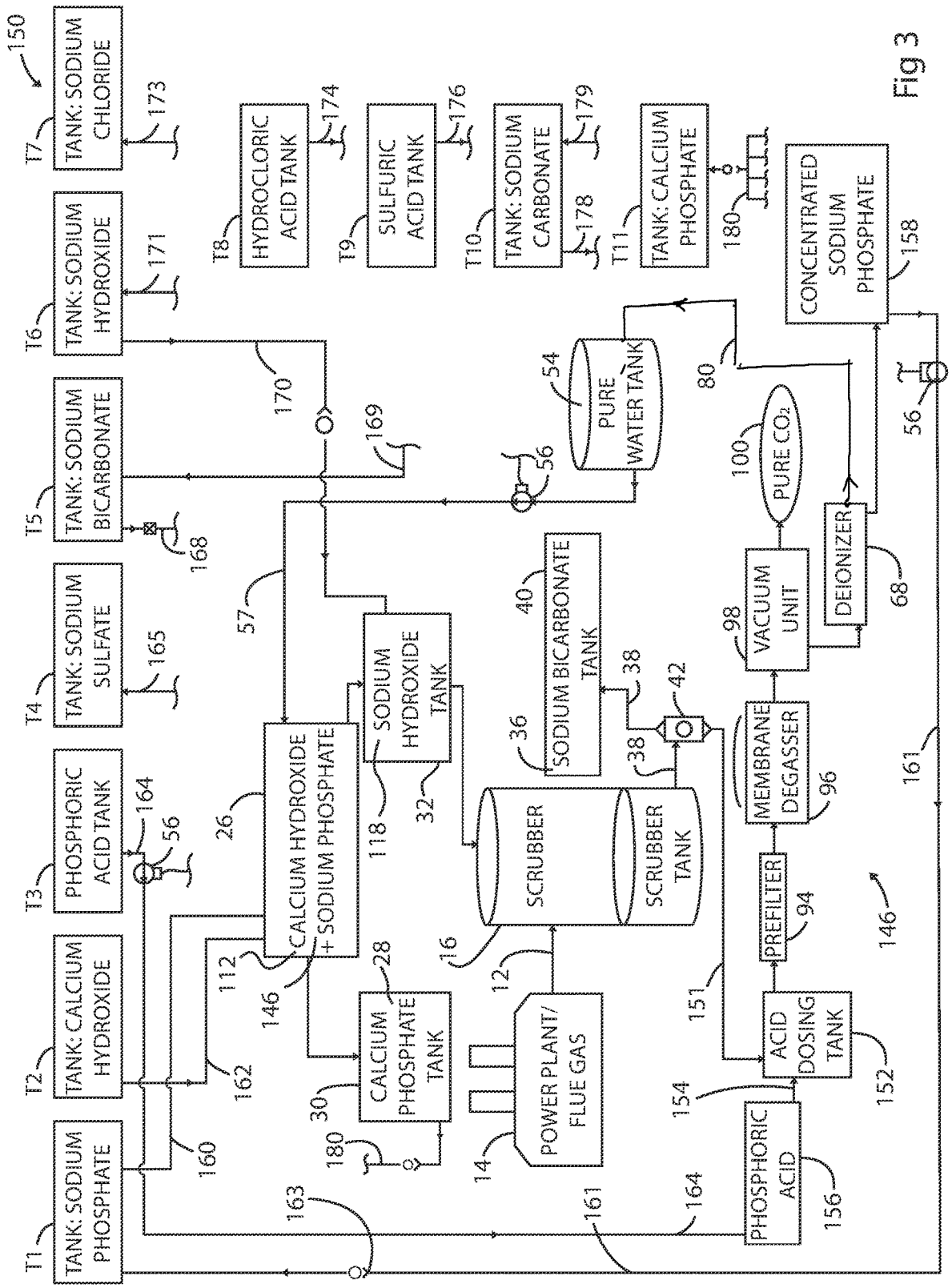
FIG. 3 is a partial flow chart and a partial diagrammatic representation of yet another embodiment taken from the above noted embodiments.

Referring to the embodiment of FIG. 3, this embodiment relates, at least to portions of FIGS. 1B & 1C and sets forth a fifth fluid pathway 146. FIG. 3 further includes a storage and supply control system 150. The storage and control system 150 is operational to supply and receive various blended solutions 22, solubilizers 24, alkaline liquids 20, ionic solids 28 and various acids to and from components/tanks within the above noted Figures. This will be further discussed here-in-after.

FIG. 3 includes many of the same elements disclosed in FIG. 1B including the multidirectional valve 42 connected to the scrubber 16 and the sodium bicarbonate tank 40. In the embodiment of FIG. 3, the sodium bicarbonate within tank 40 is delivered through line 151 to a third acid dosing tank 152. Likewise, even though sodium bicarbonate is being produced and delivered to the third acid dosing tank 152 herein, it is recognized that commercially available sodium carbonate or commercially available sodium bicarbonate could be delivered to the third acid dosing tank 152 as a separate process and would still obtain the same results as described hereinafter. A line 154 connects the third dosing tank 152 to an acid tank 156 containing phosphoric acid. Other acids may be used without departing from the essence of the subject process.

The main purpose of the phosphoric acid is to aid in loosening any dissolved $CO_2$ gases contained in the aqueous solution flowing therethrough. As the phosphoric acid 156 and the sodium bicarbonate solution 36 mix within the third acid dosing tank 152, the combined flow is metered therethrough. An exothermic reaction occurs therein loosening the $CO_2$ in the form of carbonic acid. The carbonic acid quickly decomposes to release the $CO_2$ gases and the pure water. The phosphoric acid dosed liquid 156 is passed through the prefilter 94 to remove any precipitates that may have formed. Likewise, in the membrane degasser 96, the $CO_2$ gases are separated from the aqueous solution and by use of the vacuum unit 98, the $CO_2$ gasses are drawn off and passed to a $CO_2$ storage unit. The separated solution consisting mostly of sodium phosphate is directed into the deionizer 102 to remove all of the dissolved salt content from the solution. The pure water is passed to the water tank 54 and the concentrated sodium phosphate solution is passed to a sodium phosphate tank 158.

The storage and control system 150 includes a plurality of supply/storage tanks T1-T11. Each of the supply/storage tank T1-T11 being labeled with the product that it contains and each of the tanks T1-T11 is operatively connected to associated tanks within different ones of all of the FIGS. except FIG. 1. Due to the varied scope of the FIG. 1 processes, many of the tanks in FIG. 1 could contain different byproducts when compared to the labeling of all of the supply/storge tanks T1-T11. This is due to the chemical mixing of different compounds. If other byproducts are being produced, the current byproduct not being used could be replaced with the new byproduct. Further, new supply/storage talks could be added. It is recognized that the remaining Figures illustrate only one possible product that could be supplied/stored in the illustrated tanks T1-T11. As clearly set forth hereinafter, the interconnection of the plurality of supply/storage tanks T1-T11 with respect to the remaining Figures is clearly outlined. Since FIG. 1 has tanks that could utilize other fluid solutions at different times, it is not convenient to show the possibilities in FIG. 1. The interconnections will be set forth only with respect to the remaining Figures.

Referring back to FIG. 3, a fluid line 160 selectively controls the flow of sodium phosphate from the fluid flow tank T1 to the mixing tank 26 of all of the remaining Figures. A fluid flow line 161 controls fluid flow from the concentrated sodium phosphate tank 158 of FIG. 5 to the fluid flow tank T1. The fluid pump 56 is disposed in the line 161 and is selectively operable to assist in moving the concentrated sodium phosphate solution from the tank 158 to the fluid flow tank T1. Depending on the length of line 161, a check valve 163 may be needed in the line to inhibit back flow. Check valves will hereinafter be used as needed in fluid lines without labeling them (well known in the art).

It is recognized that the fluid pump 56 may be needed in other lines shown hereinafter based on fluid flow needs and may not be shown herein. A general principle would be if any of the fluid flow tanks T1-T11 are higher than the tank or tanks being supplied with output flow no fluid pump 56 is needed in the respective output lines. Likewise, the same principle applies to each of the input lines directing fluid flow into the fluid flow tanks T1-T11 from the various storage tanks of the different embodiment shown in the Figures. If any of the various storage tanks shown in the Figures are lower than the fluid flow tanks T1-T11, then a fluid pump 56 or a check valve 163 may be needed in the respective fluid flow lines leading to the respective fluid flow tanks T1-T11.

A fluid line 162 selectively controls the flow of calcium hydroxide from the supply/storage tank T2 to the mixing tank 26. A fluid line 164 (FIG. 3) selectively controls the flow of phosphoric acid from the fluid flow tank T3 to the acid feed tank 156. A fluid line 165 (FIG. 1B) selectively controls fluid flow from the concentrated sodium sulfate salt storage tank 78 to the supply/storage tank T4 (FIG. 3). A fluid line 169 (FIGS. 1A,2&3) selectively controls fluid flow from the concentrated sodium bicarbonate tank 52 (FIG. 1A) and the concentrated sodium bicarbonate tank 52' (FIG. 2) to the supply/storage tank T5 (FIG. 3). A fluid line 170 (FIG. 3) selectively controls fluid flow of sodium hydroxide from the supply/storage tank T6 to the sodium hydroxide tank 32 of FIG. 3. It is recognized that the fluid flow in line 170 could also be delivered to tanks 32 of FIGS. 1A,1B&2 if desired. A fluid line 171 (FIGS. 1C&3) selectively controls fluid flow from the sodium hydroxide storage tank 78 (FIG. 1C) to the supply/storage tank T6 (FIG. 3). A fluid line 173 selectively controls fluid flow from the sodium chloride tank 104 (FIG. 1C) to the supply/storage tank T7 (FIG. 3). A line 174 selectively controls fluid flow from the hydrochloric acid tank T8 (FIG. 3) to the second acid tank 92 (FIG. 1C). Likewise, a line 176 selectively controls the flow of sulfuric acid fluid from the supply/storage tank T9 (FIG. 3) to the first acid tank 66 (FIG. 1B). Additionally, a line 178 selectively controls the flow of sodium carbonate fluid from the supply/storage tank T10 (FIG. 3) to the sodium carbonate tank 32 (FIG. 1C) and a line 179 selectively controls the flow of sodium carbonate fluid from the sodium carbonate tank 32 (FIG. 1C) to the supply/storage tank T10 (FIG. 3). The last supply/storage tank T11(FIG. 3) controllably receives calcium phosphate from the respective calcium phosphate tanks 32 (FIGS. 1A,1B,1C&FIG. 2) through line 180.

It is recognized that the quantity of supply/storage tanks could be more or less than that illustrated and shown herein.

It is further recognized that the storage and supply system 150 could be readily controlled with an electronic controller (not sown) and associated written program (not shown) to control each of the supply/storage tanks T1-11 to obtain a desired continuous running process that functions to chemically clean gases being exhausted from fossil fuel power plants, chemically produce reusable products for reuse in the process, produce commercially saleable products, and to remove and capture carbon dioxide from the flue gases for other commercial uses.

With respect to all of the above noted FIGS., the cleaned exhaust flue gases 12 exiting from the scrubber 16 may be safely emitted to the atmosphere through an exhaust (not shown).

INDUSTRIAL APPLICABILITY

The subject process above provides a variety of ways to chemically mix two different solutions for the purpose of producing an ionic solid 28 and an alkaline liquid solution 20. The chemically produced ionic solid may be marketed commercially and the second chemically produced alkaline liquid solution may be marketed commercially or reused within the subject process 10.

With respect to FIG. 1, the process 10 sets forth the exhaust gas cleanup and recovery system that captures $CO_2$, removes other detriment exhaust gases, such as sulfur dioxide and nitrogen oxides from the flue exhaust of the power plant. The process 10 further sets forth sequestering various byproducts for storage and/or future commercialization.

The mixing tank 26 mixes two different solutions that includes one blended solution 22 and the solubilizer 24 to chemically produce the ionic solid 28 for commercial use and the alkaline liquid solution 20 for use in the subject process 10. The alkaline liquid solution 20 is directed to and thru the wet scrubber 16 to interact with the detrimental exhaust flue gases coming from the power plant 14. The $CO_2$ gases contained within the flue gases 12 are captured by the alkaline liquid solution 20. The exhaust flue gases 12 from the power plant 14 also contains other detrimental exhaust gases 12, such as sulfur dioxide and nitrogen oxides. Within the wet scrubber 16, the mixing of the power plant exhaust gases 12 with the alkaline liquid solution 20 which produces a chemical reaction therebetween. The chemical reaction removes the sulfur dioxide and the nitrogen oxides and at the same time the captured $CO_2$ gases are chemically transformed to a newly formed sodium bicarbonate solution 36. The sodium bicarbonate solution 36 exits the wet scrubber 16 and is retained in the sodium bicarbonate solution tank 40.

FIG. 1 further sets forth three different fluid pathways 46, 60, & 84, that selectively function to refine the sodium bicarbonate solution 36 into different usable byproducts for reuse in the subject process 10 or marketed for commercial uses. The multi-directional valve 42 selectively controls the flow of the sodium bicarbonate solution 36 to the sodium bicarbonate solution tank 40 from the wet scrubber 16 and further, selectively controls the flow of the fluid to each of the respective fluid pathways 46,60 and 84.

In the first fluid pathway 46, the sodium bicarbonate solution 36 is directed to and through the deionizer 48. The deionizer 48 function to separate the water from the dissolved sodium bicarbonate salts. The dissolved sodium bicarbonate salts 36 are directed to the concentrated sodium bicarbonate tank 52 and the pure water is passed through the line 53 to the pure water tank 54. The water in the pure water tank 54 has a pH factor of 7 or more. The concentrated sodium bicarbonate solution 36 may be reused in the process or marketed commercially.

In the second fluid pathway 60, the sodium bicarbonate solution 36 is selectively directed to the first acid dosing tank 64 and the first acid tank 66 directs a first acid 66 to the first acid dosing tank 64 to produce the exothermic reaction therein. The acid functions to loosen the $CO_2$ gases from the sodium bicarbonate solution 36 in the form of carbonic acid. Any contaminants within the sodium bicarbonate solution 36 are removed by the prefilter 94. The sodium bicarbonate solution 36 quickly decomposes to release the $CO_2$ gases and clean water. As the salt solution passes through the membrane degasser 70, the vacuum unit 72 draws the high-purity $CO_2$ gases away from the salt solution and delivers it to the pure $CO_2$ tank 74. The remaining portion of the salt solution is directed to the deionizer 76 that functions to remove all of the salt content therein from the pure water. The high-quality salt solution, in the form of sodium sulfate, is delivered to the concentrated salt tank 78 for commercial use. The pure water is delivered to the pure water tank 54.

In the third fluid pathway 84, the sodium bicarbonate solution 36 is selectively directed to the second acid dosing tank 88 and the second acid tank 92 directs a second acid to the second acid dosing tank 88 to produce the exothermic reaction therein. The acid functions to loosen the carbon dioxide from the sodium bicarbonate solution 36 in the form of carbonic acid. Any contaminants within the sodium bicarbonate solution 36 are removed by the prefilter 68. The carbonic acid solution quickly decomposes to release $CO_2$ gases and produce clean water. As the salt solution passes through the membrane degasser 96, the vacuum unit 98 draws the high-purity $CO_2$ gases away from the salt solution and delivers it to the pure $CO_2$ tank 100.

The remaining portion of the salt solution exits the membrane degasser 96 and all or a portion of the remaining solution is selectively directed through the multi-directional valve 101 to the deionizer 102. The deionizer 102 functions to remove all of the salt content therein from the pure water. The high-quality salt solution, in the form of sodium chloride, is delivered to the concentrated salt tank 104 for commercial use. The pure water is delivered to the pure water tank 54 through line 105.

Another portion of the remaining salt solution exiting the membrane degasser 96 is selectively directed to the electrolysis unit 106. The solution of sodium bicarbonate solution 36 within the electrolysis unit 106 is subjected to an electrical current to separate any sodium hydroxide contained therein and deliver it to a sodium hydroxide storage tank 108.

Referring to FIG. 2, a fourth fluid pathway 128 is presented. The operation of the fourth fluid pathway 128 is very similar to that of FIG. 1A. The solutions mixed in mixing tank 26 and the results of the chemical reactions thereof are also the same. The power plant 14 that is producing the exhaust flue gases 12 containing detriment exhaust gases 12 to the wet scrubber 16 are likewise the same. The alkaline sodium hydroxide solution 118 functions the same to capture the $CO_2$ gases from the flue gases flowing therethrough. The chemical reaction between the exhaust flue gases 12 and the sodium hydroxide solution 118 within the wet scrubber 16 is the same as FIG. 1A, to remove the detriment gases of sulfur dioxide and nitrogen oxides. During the chemical reaction, the captured $CO_2$ gases are chemically transformed to a newly formed sodium bicarbonate solution 36. The sodium bicarbonate solution 36 containing the captured $CO_2$ is delivered to the sodium bicarbonate tank 40 for reuse.

In the subject embodiment of FIG. 2, The sodium bicarbonate solution 36 from the wet scrubber 16 and/or the sodium bicarbonate solution tank 40 is selectively delivered to the deionizer 48. The deionizer 48 functions to separate the pure water from the sodium bicarbonate solution 36. The pure water is delivered to the pure water tank 54 and the concentrated sodium bicarbonate solution 36' is passed to the concentrated sodium bicarbonate solution tank 52'.

In the subject embodiment, the second mixing tank 130, is connected to both of the concentrated sodium bicarbonate tank 52' and the sodium bicarbonate solution tank 40. The second mixing tank 130 contains calcium hydroxide 112 and water therein. The concentrated sodium bicarbonate solution 36' from the concentrate sodium bicarbonate tank 52' serves as the solubilizer for the calcium hydroxide 112 in the second mixing tank 130. Additionally, the alkaline sodium bicarbonate solution 36 in the sodium bicarbonate tank 40 may also be used as a solubilizer.

The chemical reaction within the second mixing tank 130 produces a calcium carbonate ionic solid 122 that is stored in the calcium carbonate tank 142. The other liquid solution produced within the mixing tank 130 is sodium hydroxide 118. The sodium hydroxide 118 is passed from the second mixing tank 130 to the sodium hydroxide tank 32 for reuse.

From the above description, it is very clear that the subject process 10 mixes two solutions and water in a mixing tank to create a chemical reaction therebetween. This chemical reaction produces two new byproducts that may be marketed commercially or reused in the process. When reused in the process 10, the newly created alkaline liquid solution 20 is passed to a scrubber 16 to interface with exhaust flue gases from a power plant 13 to capture $CO_2$ gases from the flue gases 12. The interface of the alkaline liquid solution 20 with the flue gases creates a chemical reaction therein. During the chemical reaction, the captured $CO_2$ gases are chemically transformed to a newly formed sodium bicarbonate solution 36. Various fluid pathways are also provided to produce and store several byproducts for commercial uses.

Referring to FIG. 3, the overall process is similar to that of FIGS. 1&1C except in FIG. 3 the blended solution is calcium hydroxide 112 and in FIG. 1C the blended solution is calcium carbonate 122. During the mixing of the calcium hydroxide 112 with the sodium phosphate 114 in the mixing tank 26 of FIG. 3, the chemical reaction within FIG. 3 produces an alkaline liquid of sodium hydroxide 118. However, the chemical reaction within the mixing tank 26 of FIG. 1C produces an alkaline liquid of sodium carbonate 124. Additionally, in the fourth flow path of FIG. 3, when the phosphoric acid mixes in the acid dosing tank 152 with the sodium bicarbonate 36 from the scrubber 16/sodium bicarbonate tank 40 through the multi-directional valve 42 and line 151 As the phosphoric acid 156 and the sodium bicarbonate solution 36 mix within the third acid dosing tank 152, the combined flow is metered therethrough. An exothermic reaction occurs therein loosening the $CO_2$ in the form of carbonic acid. The carbonic acid quickly decomposes to release the $CO_2$ gases and the pure water. The phosphoric acid dosed liquid 156 is passed through the prefilter 94 to remove any precipitates that may have formed. Likewise, in the membrane degasser 96, the $CO_2$ gases are separated from the aqueous solution and by use of the vacuum unit 98, the $CO_2$ gasses are drawn off and passed to a $CO_2$ storage unit. The separated solution consisting mostly of sodium phosphate is directed into the deionizer 102 to remove all of the dissolved salt content from the solution. The pure water is passed to the water tank 54 and the concentrated sodium phosphate solution is passed to a sodium phosphate tank 158. Additional in FIG. 3, a storage and control system 150 includes a plurality of supply and storage tanks T1-T11. Each of the supply and storage tanks T1-T11 functions in response to a command from the control system 150 to deliver or receive fluid flow from respective ones of the tanks within the FIGS. 1A,1B,1C, FIG. 2 and FIG. 3. as illustrated and set forth above. The control system 150 permits continuous operation of the various processes within the overall exhaust gas cleanup and recovery system along with $CO_2$ capture.

Other embodiments as well as certain variations and modification of the embodiments herein shown and described will obviously occur to those skilled in the art upon becoming familiar with the underlying concept. It is to be understood, therefore, that the subject processes, as claimed, may be practiced otherwise than as specifically set forth herein.

What is claimed is:

1. A process comprising chemically mixing a single liquid solution with a solubilizer in a mixing tank to produce an ionic solid and an alkaline liquid solution;
   directing exhaust gases containing $CO_2$ and other detrimental gasses from a power plant to a wet scrubber; and
   directing the alkaline liquid solution through the wet scrubber to interface with the flue gases from the power plant to capture $CO_2$ gases from the flue gases and to create a chemical reaction therein for removing the detrimental gases and the captured $CO_2$ gases are chemically transformed to a newly formed sodium bicarbonate solution.

2. The process of claim 1 wherein the single liquid solution is one of calcium hydroxide and calcium carbonate, the solubilizer is sodium phosphate, and the alkaline liquid solution is one of sodium hydroxide and sodium carbonate.

3. The process of claim 2 wherein the single liquid solution is calcium hydroxide and the alkaline liquid solution is sodium hydroxide.

4. The process of claim 2 wherein the single liquid solution is calcium carbonate and the alkaline liquid solution is sodium carbonate.

5. The process of claim 2 wherein the alkaline liquid solution is sodium hydroxide and the ionic solid is calcium phosphate.

6. The process of claim 2 wherein the alkaline liquid solution is sodium carbonate and the ionic solid is calcium phosphate.

7. The process of claim 1 including selectively directing the sodium bicarbonate to one of a first acid dosing tank, a second dosing tank, and a deionizer unit.

8. The process of claim 7 wherein the first dozing tank has a sulfuric acid therein which chemically acts on the sodium bicarbonate liquid solution to loosen the $CO_2$ therefrom;
   passing the dosed liquid solution through a prefilter to remove any precipitates and through a membrane degasser unit to separate the $CO_2$ from the liquid solution and a vacuum unit passes the $CO_2$ to a storage tank; and
   selectively directing the remaining liquid solution to a deionizer unit to separate the water from the sodium sulfate solution, wherein the water is passed to the pure water tank and the sodium sulfate is stored for commercial uses.

9. The process of claim 7 wherein the second dozing tank has hydrochloric acid therein that chemically acts on the sodium bicarbonate solution to separate the $CO_2$ therefrom;
   passing the dosed liquid solution through a prefilter to remove any precipitates and through a membrane degasser unit to separate the $CO_2$ from the liquid solution;
   directing the separated $CO_2$ to a pure $CO_2$ storage tank for commercial uses; and
   selectively directing the remaining liquid solution to one of the deionizer unit and an electrolysis unit.

10. The process of claim 9 selectively directing the remaining liquid solution from the membrane degasser to the deionizer unit to separate the water from the sodium chloride; and
   wherein the pure water is passed to the pure water tank and the sodium chloride is stored for commercial uses.

11. The process of claim 9 selectively directing the remaining liquid solution from the membrane degasser to the electrolysis unit to electrically separate sodium hydroxide from the liquid solution for commercial uses.

12. The process of claim 1 wherein the alkaline liquid solution storage is a sodium hydroxide tank and the process further include a calcium hydroxide plus water tank fluidly connected to both the sodium bicarbonate solution tank and a concentrated sodium bicarbonate solution tank to receive sodium bicarbonate liquid solution therefrom; and
   chemically mixing the calcium hydroxide and water with the sodium bicarbonate liquid solution to produce sodium hydroxide for use in the process and to produce calcium carbonate for commercial uses.

\* \* \* \* \*